US011498692B2

(12) United States Patent
Tian

(10) Patent No.: US 11,498,692 B2
(45) Date of Patent: Nov. 15, 2022

(54) GROMMET ASSEMBLY AND METHOD OF INSTALLING A GROMMET ASSEMBLY

(71) Applicant: The Boeing Company, Chicago, IL (US)

(72) Inventor: Yuri Tian, Lake Stevens, WA (US)

(73) Assignee: The Boeing Company, Chicago, IL (US)

(*) Notice: Subject to any disclaimer, the term of this patent is extended or adjusted under 35 U.S.C. 154(b) by 456 days.

(21) Appl. No.: 16/600,012

(22) Filed: Oct. 11, 2019

(65) Prior Publication Data

US 2021/0107677 A1 Apr. 15, 2021

(51) Int. Cl.
| | |
|---|---|
| *H02G 3/22* | (2006.01) |
| *B64D 41/00* | (2006.01) |
| *B29C 65/48* | (2006.01) |
| *B64F 5/10* | (2017.01) |
| *H01B 17/58* | (2006.01) |
| *H02G 1/00* | (2006.01) |
| *F16L 5/08* | (2006.01) |
| *F16L 5/10* | (2006.01) |
| *B29L 31/30* | (2006.01) |

(52) U.S. Cl.
CPC .............. *B64D 41/00* (2013.01); *B29C 65/48* (2013.01); *B64F 5/10* (2017.01); *F16L 5/08* (2013.01); *F16L 5/10* (2013.01); *H01B 17/583* (2013.01); *H02G 1/00* (2013.01); *H02G 3/22* (2013.01); *B29L 2031/3076* (2013.01); *B64D 2221/00* (2013.01)

(58) Field of Classification Search
CPC .. H02G 3/22; H02G 3/24; H02G 3/26; H02G 3/30; H02G 3/36; H02G 15/007; H02G 15/04; H02G 3/083; B60R 16/0222; B60R 16/0215; B60R 16/02; F16L 5/10; F16L 13/0841; F16L 15/08; H01B 17/56; H01B 17/583; H01B 17/60
USPC .... 174/650, 151, 135, 152 G, 153 G, 152 R, 174/659, 664, 137, 155, 156; 248/74.1, 248/74.2, 74.3, 68.1, 65, 49, 56; 16/2.1, 16/2.2; 385/134, 135
See application file for complete search history.

(56) References Cited

U.S. PATENT DOCUMENTS

| | | | | |
|---|---|---|---|---|
| 2,517,717 | A * | 8/1950 | Rose ..................... | H01B 17/306 174/152 G |
| 2,922,836 | A * | 1/1960 | Brown ................... | H02G 3/088 174/153 G |
| 2,961,691 | A * | 11/1960 | Roy ....................... | C25D 7/0607 174/152 G |
| 3,779,585 | A * | 12/1973 | Handzlik ................ | F16L 3/00 174/652 |
| 5,736,677 | A * | 4/1998 | Sato ........................ | H02G 3/22 174/152 G |

(Continued)

*Primary Examiner* — Angel R Estrada
(74) *Attorney, Agent, or Firm* — Duft & Bornsen, PC

(57) ABSTRACT

Grommet assembly and method for installing a grommet assembly in a penetration hole of a panel. In one embodiment, a grommet assembly is comprised of multiple parts, including end members having a diameter greater than the penetration hole, and a middle member having a diameter sized to fit within the penetration hole. Each of the members includes one or more conduit holes for a conduit that is routed through the penetration hole, and an installation slit disposed between an outer peripheral surface and a conduit hole.

20 Claims, 10 Drawing Sheets

(56) References Cited

U.S. PATENT DOCUMENTS

| | | | |
|---|---|---|---|
| 6,119,305 A * | 9/2000 | Loveall | H05K 9/0018 174/152 G |
| 6,348,657 B1 * | 2/2002 | Haslock | F16L 5/10 174/152 G |
| 7,681,923 B2 | 3/2010 | Negley et al. | |
| 8,944,718 B2 * | 2/2015 | Smith | B23P 11/00 403/371 |

\* cited by examiner

GROMMET ASSEMBLY AND METHOD OF INSTALLING A GROMMET ASSEMBLY

FIELD

This disclosure relates to the field of grommets for supporting a conduit penetrating a panel.

BACKGROUND

Various machines, such as aircraft, vehicles, watercraft, etc., are constructed with structural panels formed from metal materials, composite materials, and the like. These machines may also include conduits, such as wires, cables, lines, tubes (e.g., a hydraulic tube), etc., that penetrate a panel at penetration points. The penetration point of a panel includes a penetration hole through which one or more conduits are routed. A grommet may be installed at the penetration hole to facilitate passage of the conduit through the panel, and to provide for proper attachment of the conduit to the panel in a way that restrains movement of the conduit and prevents damage to both the conduit and the panel. A typical grommet is a monolithic ring-shaped object having annular sections spaced apart from one another by an annular or circumferential groove. A grommet of this type is pressed into the penetration hole so that the annular sections contact opposing sides of the panel, and the groove engages the edge of the penetration hole. Although grommets of this type may be effective for their intended purpose, there may be situations where the grommet is difficult to press into the penetration hole. Thus, it may be beneficial to design other types of grommets.

SUMMARY

Provided herein is a multi-piece grommet assembly. A grommet assembly as described herein may include end members that are larger than a penetration hole, and a middle member that fits within the penetration hole. An end member and the middle member may be installed from one side of the panel, while the other end member may be installed from the other side of the panel. The members of the grommet assembly may be secured together after installation in the panel. Because the end members are installed from opposing sides of the panel, an installer does not need to press an end member through the penetration hole, which may require a relatively high amount of force. Thus, one technical benefit is that the grommet assembly described herein is easier to install, and may avoid injuries to installers.

One embodiment comprises a grommet assembly that includes a first end member that has a diameter greater than a penetration hole of a panel, a middle member that has a diameter sized to fit within the penetration hole of the panel, and a second end member that has a diameter greater than the penetration hole of the panel. The first end member includes a first conduit hole (or multiple conduit holes), and a first installation slit disposed between an outer peripheral surface of the first end member and the first conduit hole. The middle member includes a second conduit hole (or multiple conduit holes), and a second installation slit disposed between an outer peripheral surface of the middle member and the second conduit hole. The second end member includes a third conduit hole (or multiple conduit holes), and a third installation slit disposed between an outer peripheral surface of the second end member and the third conduit hole. The first end member, the middle member, and the second end member are made from an elastic material.

In another embodiment, the middle member is bonded to the first end member with an adhesive prior to insertion of the middle member in the penetration hole from a first side of the panel.

In another embodiment, the second end member is bonded to the middle member with an adhesive from a second side of the panel after insertion of the middle member in the penetration hole of the panel.

In another embodiment, the first end member and the middle member comprise a monolithic part.

In another embodiment, the first end member, the middle member, and the second end member further include one or more fastener holes.

In another embodiment, the grommet assembly further includes one or more fasteners configured to pass through the fastener holes to secure the first end member, the middle member, and the second end member together.

In another embodiment, the fasteners comprise a spacer configured to fit within the fastener holes, a bolt having a head and having a shank configured to fit within the spacer, and a nut configured to screw onto threads of the bolt.

In another embodiment, the panel is a structure of an aircraft, and the first conduit hole, the second conduit hole, and the third conduit hole are sized to accommodate a hydraulic tube of the aircraft.

In another embodiment, the panel comprises a composite panel.

In another embodiment, when installed, the first installation slit of the first end member and the second installation slit of the middle member are aligned, and the third installation slit of the second end member is oriented at an opposite direction than the first installation slit and the second installation slit.

Another embodiment comprises an aircraft having a composite panel that includes a penetration hole through which a conduit is routed, and a grommet assembly installed in the penetration hole to secure the conduit. The grommet assembly includes a first end member having a diameter greater than the penetration hole of the composite panel, a middle member having a diameter sized to fit within the penetration hole of the composite panel, and a second end member having a diameter greater than the penetration hole of the composite panel. The conduit passes through conduit holes of the first end member, the middle member, and the second end member. The first end member and the middle member include installation slits configured to flex open enabling the first end member and the middle member to be installed cross-wise onto the conduit from a first side of the composite panel with the conduit holes of the first end member and the middle member surrounding the conduit. The second end member includes an installation slit configured to flex open enabling the second end member to be installed cross-wise onto the conduit from a second side of the composite panel with the conduit holes of the second end member surrounding the conduit.

In another embodiment, the middle member is bonded to the first end member with an adhesive prior to insertion of the middle member in the penetration hole from the first side of the composite panel.

In another embodiment, the second end member is bonded to the middle member with an adhesive from the second side of the composite panel after insertion of the middle member in the penetration hole of the composite panel.

In another embodiment, an annular collar of the first end member is bonded to the first side of the composite panel with an adhesive, an annular collar of the second end member is bonded to the second side of the composite panel with the adhesive, and an outer peripheral surface of the middle member is bonded to an edge of the penetration hole with the adhesive.

In another embodiment, the installation slit of the second end member is oriented at an opposite direction than the installation slits of the first end member and the middle member.

In another embodiment, the grommet assembly further includes one or more fasteners installed through fastener holes in the first end member, the middle member, and the second end member to secure the first end member, the middle member, and the second end member together.

In another embodiment, the fasteners comprise a spacer configured to fit within the fastener holes, a bolt having a head and having a shank configured to fit within the spacer, and a nut configured to screw onto threads of the bolt.

Another embodiment comprises a method of installing a grommet assembly in a penetration hole of a panel, where a conduit is routed through the penetration hole. The method comprises acquiring a first end member having a diameter greater than the penetration hole of the panel, and including a first conduit hole, and a first installation slit disposed between an outer peripheral surface of the first end member and the first conduit hole. The method further comprises acquiring a middle member having a diameter sized to fit within the penetration hole of the panel, and including a second conduit hole, and a second installation slit disposed between an outer peripheral surface of the middle member and the second conduit hole. The method further comprises acquiring a second end member having a diameter greater than the penetration hole of the panel, and including a third conduit hole, and a third installation slit disposed between an outer peripheral surface of the second end member and the third conduit hole. The method further comprises bonding the first end member to the middle member with the first conduit hole aligned with the second conduit hole, and with the first installation slit aligned with the second installation slit. The method further comprises installing the first end member and the middle member on the conduit from a first side of the panel via the first installation slit and the second installation slit, and inserting the middle member into the penetration hole from the first side of the panel. The method further comprises installing the second end member on the conduit from a second side of the panel via the third installation slit, and bonding the second end member to the middle member.

In another embodiment, the method further comprises bonding the first end member to the first side of the panel, bonding the middle member to an edge of the penetration hole, and bonding the second end member to the second side of the panel.

In another embodiment, the method further comprises securing the first end member, the middle member, and the second end member with fasteners.

The features, functions, and advantages that have been discussed can be achieved independently in various embodiments or may be combined in yet other embodiments, further details of which can be seen with reference to the following description and drawings.

DESCRIPTION OF THE DRAWINGS

Some embodiments of the present invention are now described, by way of example only, with reference to the accompanying drawings. The same reference number represents the same element or the same type of element on all drawings.

DETAILED DESCRIPTION

The figures and the following description illustrate specific exemplary embodiments. It will be appreciated that those skilled in the art will be able to devise various arrangements that, although not explicitly described or shown herein, embody the principles described herein and are included within the contemplated scope of the claims that follow this description. Furthermore, any examples described herein are intended to aid in understanding the principles of the disclosure, and are to be construed as being without limitation. As a result, this disclosure is not limited to the specific embodiments or examples described below, but by the claims and their equivalents.

Figure 1:
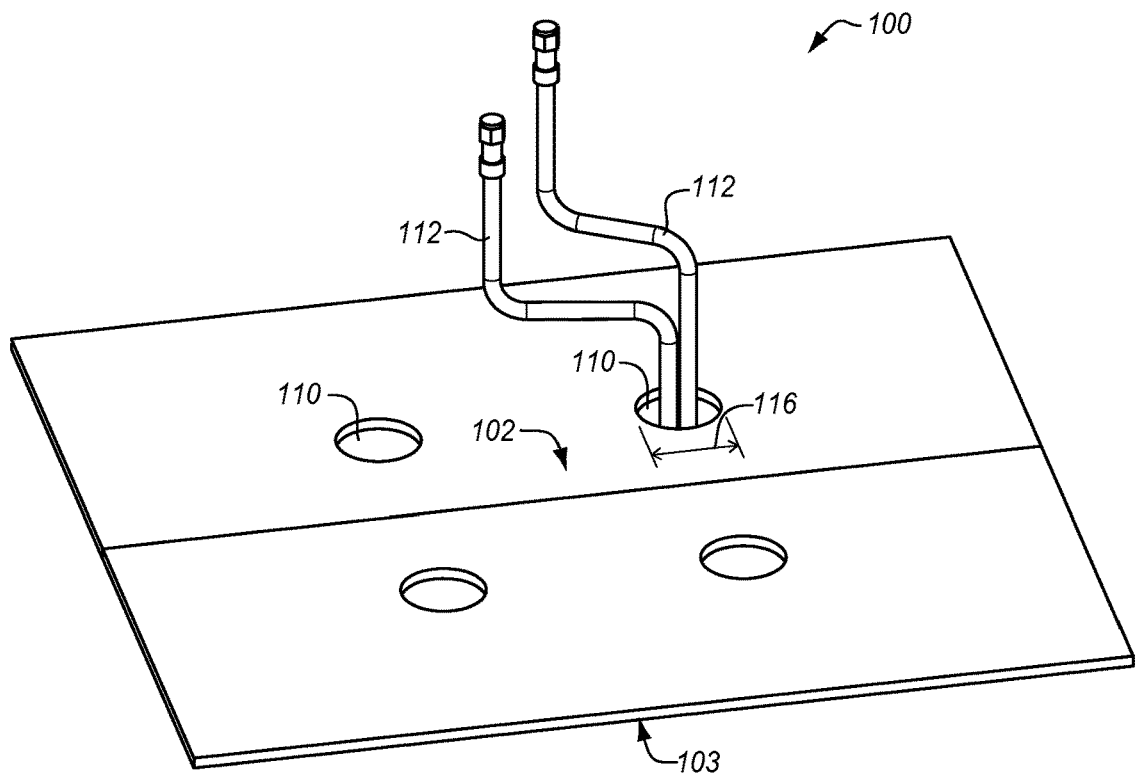
FIG. 1 is a perspective view of a panel.

FIG. 1 is a perspective view of a panel 100. Panel 100 represents a structural element that is generally flat. Panel 100 may be formed from metal materials, such as Titanium, Aluminum, etc., may be formed from composite materials, such as a Carbon Fiber Reinforced Polymer (CFRP), Carbon Fiber Reinforced Plastic (CRP), Carbon Fiber Reinforced Thermoplastic (CFRTP), etc., or may be formed from another type of material. Panel 100 has a top side 102 and a bottom side 103, although the terms "top" and "bottom" are being used merely to distinguish the two sides. Panel 100 also includes one or more penetration holes 110. Penetration holes 110 are apertures through panel 100 from top side 102 to bottom side 103 that represent a penetration point through panel 100 for one or more conduits 112. Conduits 112 may comprise wires (i.e., electrical wires), wiring harnesses, cables, lines, tubes (e.g., hydraulic tubes), etc. Although two conduits 112 are shown as being routed through a penetration hole 110, more or less conduits 112 may be routed through a penetration hole 110 in other embodiments. In FIG. 1, penetration hole 110 is a circular hole that has a diameter 116. However, it is understood that penetration hole 110 may have other shapes as desired, such as square, rectangular, oval, etc.

Figure 2:
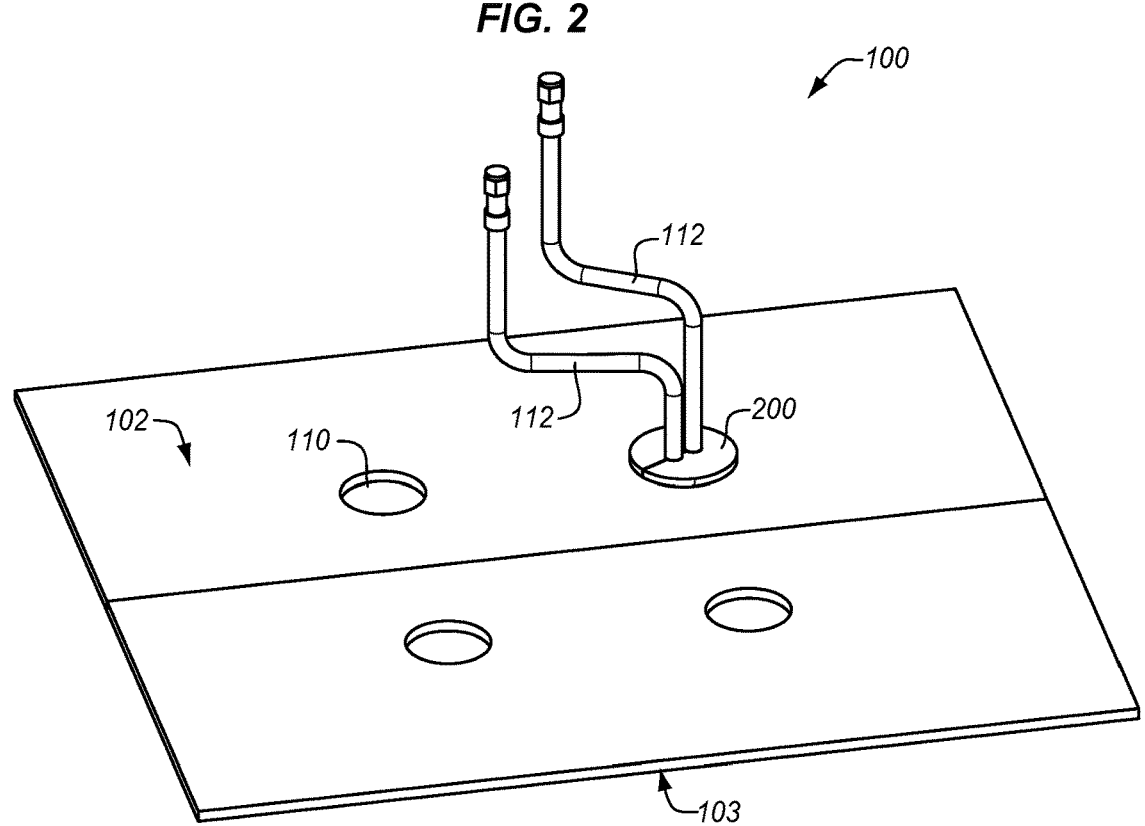
FIG. 2 illustrates a grommet assembly installed in a penetration hole in an illustrative embodiment.

Embodiments described herein provide a grommet assembly that may be installed in a penetration hole 110. FIG. 2 illustrates a grommet assembly 200 installed in a penetration hole 110 in an illustrative embodiment. Grommet assembly 200 is a multi-piece part that is configured to secure conduits 112 being routed through penetration hole 110. Grommet assembly 200 may be made from an elastic, pliable, or flexible material, such as rubber. Due to the structure of grommet assembly 200, it may be installed on conduits 112 and pressed into penetration hole 110 with minimal effort.

Figure 3:
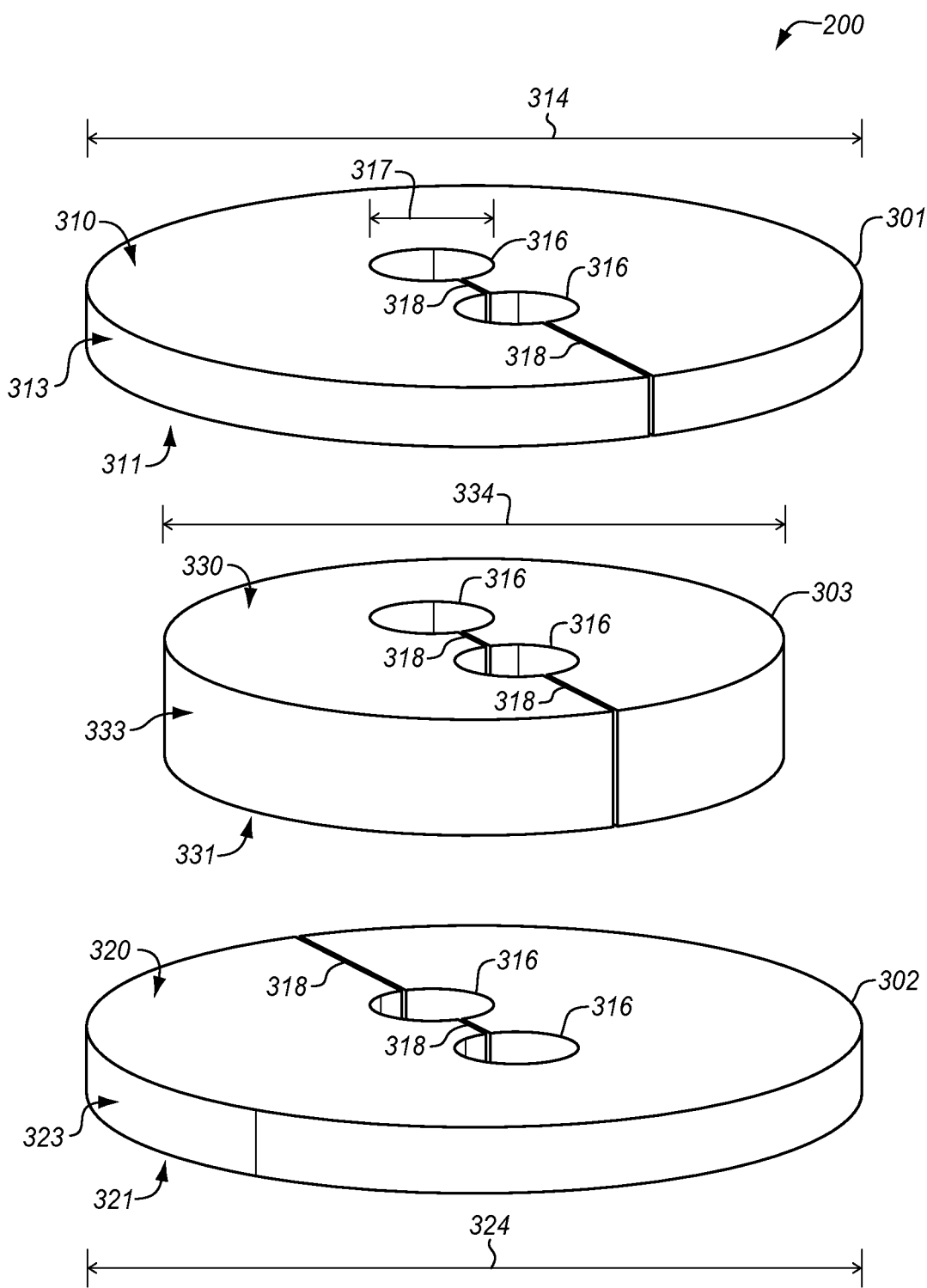
FIG. 3 is an exploded perspective view of a grommet assembly in an illustrative embodiment.

FIG. 3 is an exploded perspective view of a grommet assembly 200 in an illustrative embodiment. Grommet assembly 200 is comprised of multiple parts, including end members 301-302 and a middle member 303. In this embodiment, each member 301-303 is a separate and distinct part before installation. As a general overview, end member 301 and middle member 303 are configured to be installed on conduits 112 on the top side 102 of panel 100, and middle member 303 is pressed or inserted into the penetration hole 110. End member 302 is configured to be installed on conduits 112 on the bottom side 103 of panel 100, and is attached to middle member 303 to form a combined unit. Although the members 301-303 are shown as being circular in this embodiment, members 301-303 may have other shapes in other embodiments.

End member 301 comprises a piece or sheet of a material having a size larger than the penetration hole 110 in a panel 100 (see FIG. 1). End member 301 may have a cylindrical shape that is generally flat as shown in FIG. 3 with a top side 310 and a bottom side 311 that are parallel, and a circular cross-section with an outer peripheral surface 313 that defines the outer diameter 314 of end member 301. The outer diameter 314 of end member 301 is larger than the diameter 116 of the penetration hole 110 so that bottom side 311 of end member 301 contacts the top side 102 of panel 100 when installed, and restrains grommet assembly 200 from top side 102. End member 301 also includes one or more conduit holes 316, which comprise apertures disposed axially from a top side to a bottom side that are sized to accommodate conduits 112 routed through penetration hole 110. For example, when a conduit comprises a hydraulic tube, a conduit hole 316 may be sized to accommodate the hydraulic tube. When a conduit comprises a wiring harness, a conduit hole 316 may be sized to accommodate the wiring harness. Conduit holes 316 have an inner diameter 317 that corresponds with a diameter of a conduit. The number and placement of conduit holes 316 is provided as an example, as other configurations are considered herein.

To allow end member 301 to be installed on conduits 112, end member 301 further includes one or more installation slits 318. An installation slit 318 comprises a cut or opening disposed between one or more conduit holes 316 and outer peripheral surface 313. An installation slit 318 is configured to spread or flex open enabling end member 301 to be installed on a conduit 112 cross-wise and radially in relation to a conduit hole 316 so that conduit hole 316 surrounds conduit 112.

End member 302 also comprises a piece or sheet of a material having a size larger than the penetration hole 110 in panel 100. End member 302 may have a cylindrical shape that is generally flat as shown in FIG. 3 with a top side 320 and a bottom side 321 that are parallel, and a circular cross-section with an outer peripheral surface 323 that defines the outer diameter 324 of end member 302. The outer diameter 324 of end member 302 is larger than the diameter 116 of the penetration hole 110 so that top side 320 of end member 302 contacts the bottom side 103 of panel 100 when installed, and restrains grommet assembly 200 from bottom side 103. End member 302 also includes one or more conduit holes 316 that are configured to align with conduit holes 316 of end member 301. To allow end member 302 to be installed on conduits 112, end member 302 further includes one or more installation slits 318 disposed between conduit holes 316 and outer peripheral surface 323. In one embodiment, end member 302 have the same or similar configuration as end member 301, such as for ease of manufacturing.

Middle member 303 comprises a piece or sheet of a material sized to fit within the penetration hole 110 in panel 100. Middle member 303 may have a cylindrical shape that is generally flat as shown in FIG. 3 with a top side 330 and a bottom side 331 that are parallel, and a circular cross-section with an outer peripheral surface 333 that defines the outer diameter 334 of middle member 303. As described above, middle member 303 is sized to fit within penetration hole 110. Thus, the outer diameter 334 of middle member 303 corresponds with the diameter 116 of the penetration hole 110, meaning that outer diameter 334 may be slightly larger, generally the same, or slightly smaller than the diameter 116 of the penetration hole. The outer diameter 334 of middle member 303 is less than the outer diameters 314, 324 of end members 301, 302, respectively. Middle member 303 also includes one or more conduit holes 316 that are configured to align with conduit holes 316 of end members 301-302. To allow middle member 303 to be installed on conduits 112, middle member 303 further includes one or more installation slits 318 disposed between conduit holes 316 and outer peripheral surface 333.

Figure 4:
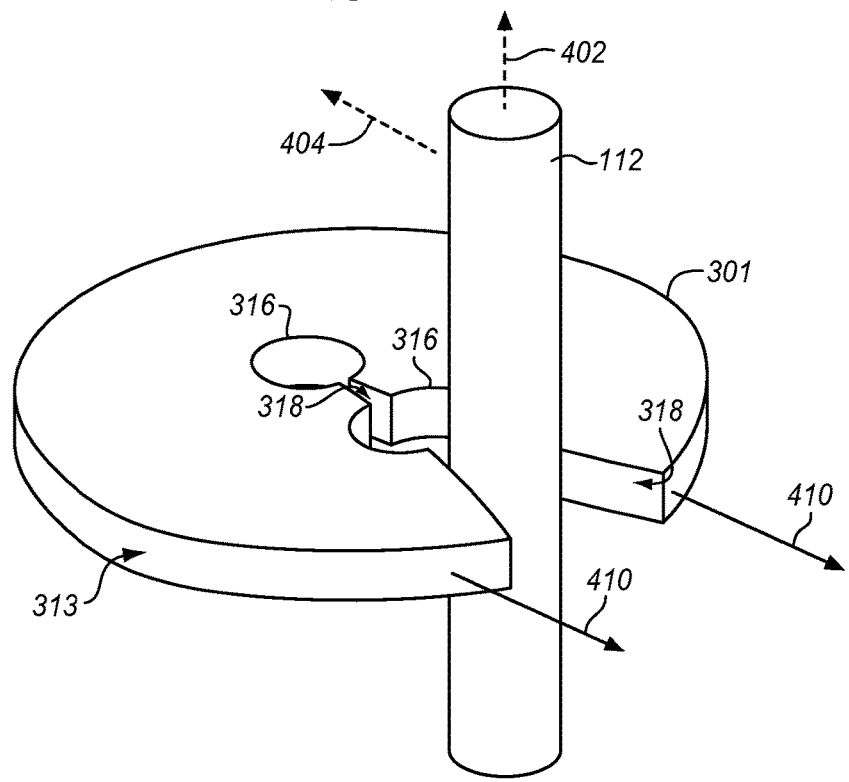
FIG. 4 is a perspective view of an end member being installed cross-wise onto a conduit in an illustrative embodiment.

As discussed above, end members 301-302 and middle member 303 may be made from an elastic material, such as rubber. Due to the elasticity of members 301-303 and the inclusion of installation slits 318, members 301-303 may be installed on a conduit 112 cross-wise (as opposed to length-wise). FIG. 4 is a perspective view of end member 301 being installed cross-wise onto a conduit 112 in an illustrative embodiment. At the location of installation slit 318, the outer peripheral surface 313 of end member 301 is pressed against conduit 112 in the direction illustrated by arrows 410. As end member 301 is pressed against conduit 112, installation slit 318 flexes or spreads open due to the elasticity of end member 301, which allows end member 301 to slide onto conduit 112 from outer peripheral surface 313. End member 301 may be slid in the direction of arrows 410 until conduit 112 is disposed within one of conduit holes 316, and the conduit hole 316 surrounds conduit 112. For the purposes of this discussion, conduit 112 may be thought of as having an axial or length-wise direction 402, and a radial or cross-wise direction 404. Due to installation slit 318, end member 301 may be installed in the cross-wise direction 404 onto conduit 112. End member 302 and middle member 303 may be installed in a similar fashion. A cross-wise installation such as this provides a technical benefit in that the end of a conduit 112 may have a fitting, plug, etc., that is larger than conduit holes 316, which prevents installation in the length-wise direction 402 by sliding an end of the conduit 112 through a conduit hole 316. And, end members 301-302 and middle member 303 may be installed on a conduit 112 after the conduit 112 is routed through a penetration hole 110, even when an end of the conduit 112 is not accessible.

Figure 5:
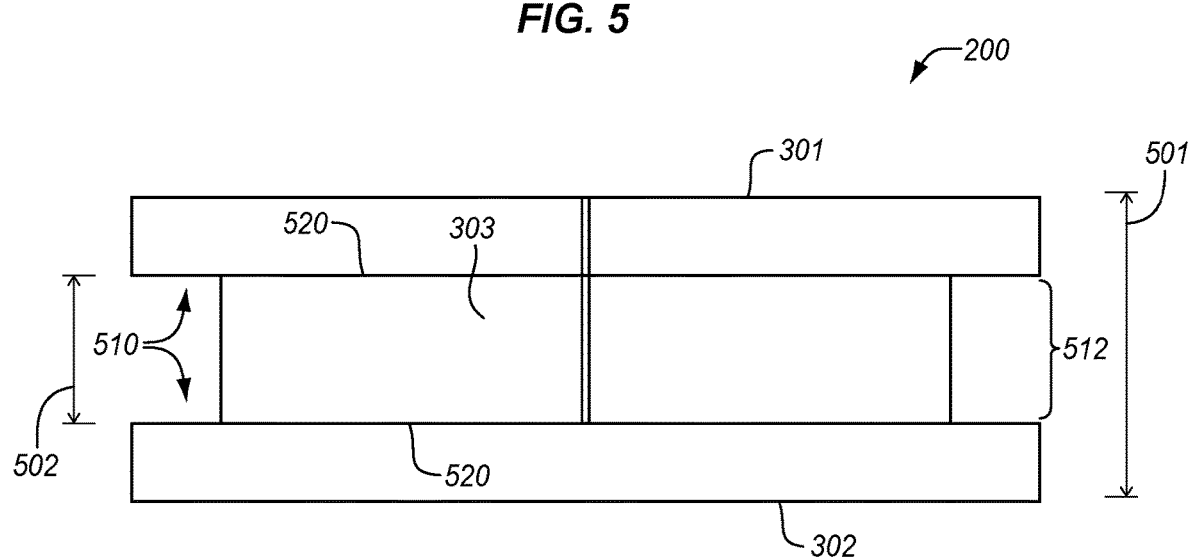
FIG. 5 is a side view of a grommet assembly in an installed configuration in an illustrative embodiment.

FIG. 5 is a side view of grommet assembly 200 in an installed configuration in an illustrative embodiment. For the purpose of this discussion, panel 100 and conduits 112 are omitted. When installed (i.e., in an installed configuration), end members 301-302 sandwich middle member 303 to secure grommet assembly 200 to panel 100. End member 301 is bonded to middle member 303 with an adhesive or the like. More particularly, at least a portion of the bottom side 311 of end member 301 is bonded to at least a portion of the top side 330 of middle member 303 (see FIG. 3). Likewise, end member 302 is bonded to middle member 303 with an adhesive or the like. More particularly, at least a portion of the top side 320 of end member 302 is bonded to at least a portion of the bottom side 331 of middle member 303 (see FIG. 3). The combined thicknesses of end members 301-302 and middle member 303 define the thickness 501 of grommet assembly 200. End members 301-302 are spaced apart by middle member 303 at a distance 502. The distance 502 between end members 301-302 corresponds with a thickness of panel 100. Because the outer diameter 334 of middle member 303 is smaller than the outer diameters 314, 324 of end members 301, 302 respectively (see FIG. 3), each of the end members 301-302 includes or defines an annular collar 510 or lip with an annular groove 512 formed between the annular collars 510. When grommet assembly 200 is installed in a penetration hole 110 of panel 100, the annular groove 512 will fit within the penetration hole 110 while the annular collars 510 of end members 301-302 secure grommet assembly 200 against opposing sides 102-103 of panel 100.

Figure 6:
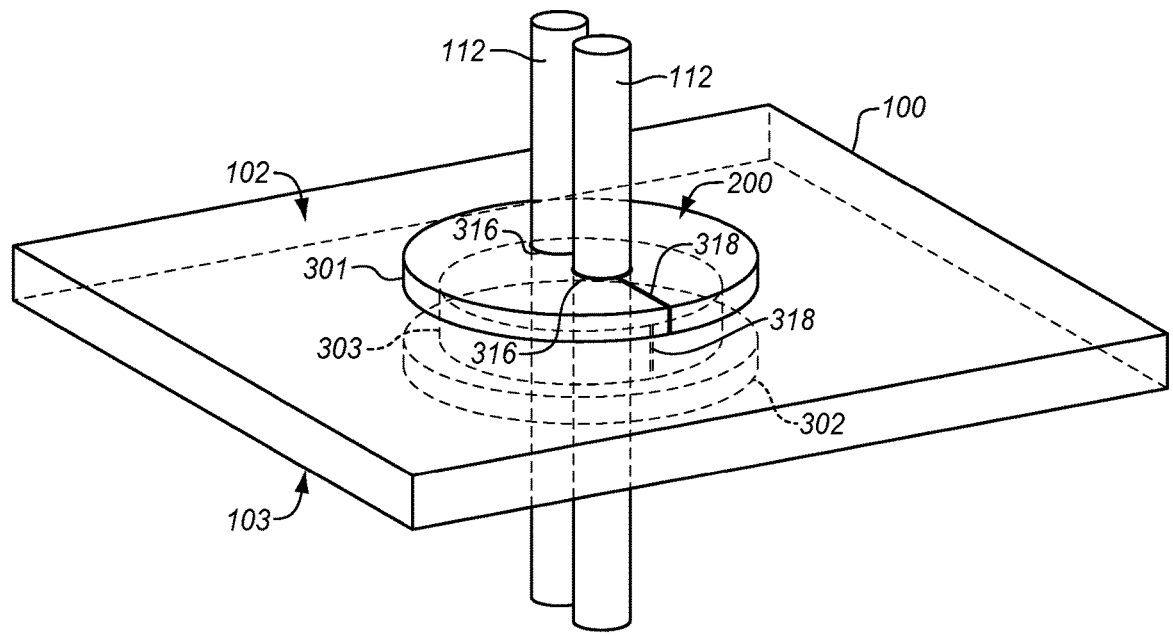
FIGS. 6-7 are perspective views of a grommet assembly installed in a panel in an illustrative embodiment.
Figure 7:
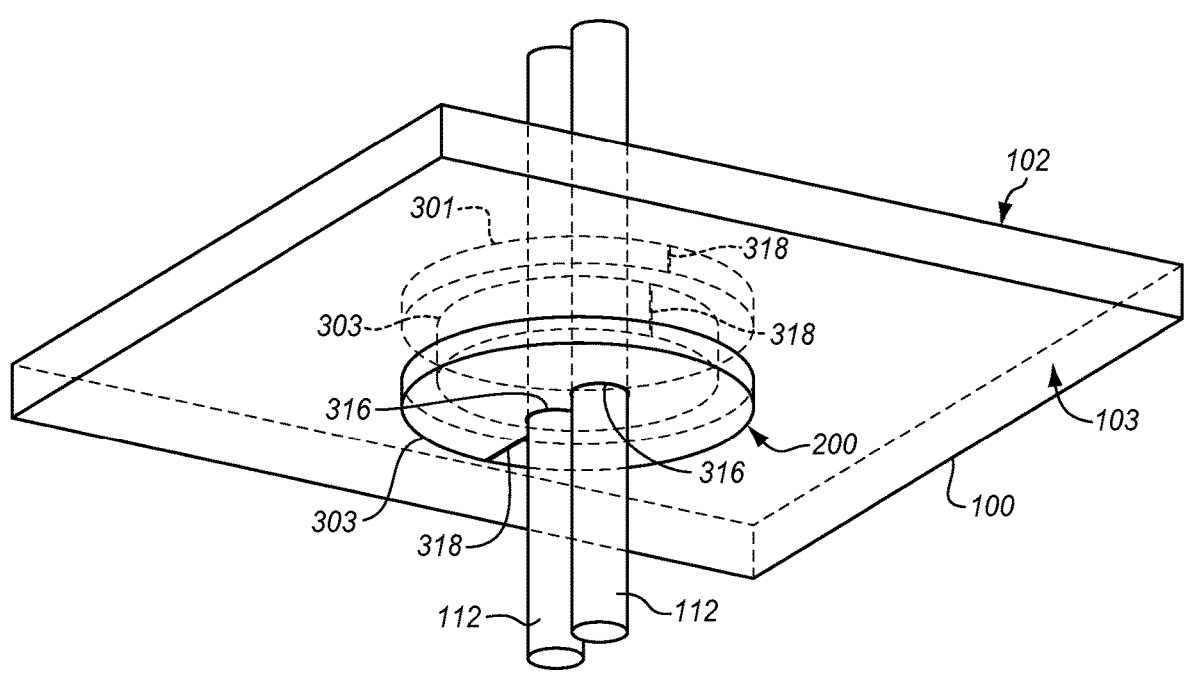

FIGS. 6-7 are perspective views of grommet assembly 200 installed in panel 100 in an illustrative embodiment. FIG. 6 is a view from the top side 102 of panel 100. As discussed above, end member 301 and middle member 303 are installed on conduits 112 from top side 102 of panel 100 via installation slits 318, and middle member 303 is pressed or inserted into penetration hole 110 (not visible in FIG. 6). The bottom side 311 of end member 301 (see FIG. 3) contacts top side 102 of panel 100 while middle member 303 is disposed within penetration hole 110. FIG. 7 is a view from the bottom side 103 of panel 100. As discussed above, end member 302 is installed on conduits 112 from bottom side 103 of panel 100 via installation slits 318. The top side 320 of end member 302 (see FIG. 3) contacts bottom side 103 of panel 100. End member 302 therefore restrains grommet assembly 200 from bottom side 103 of panel 100 while end member 301 restrains grommet assembly 200 from top side 102 of panel 100 (see FIG. 6). As may be seen in FIGS. 6-7, installation slits 318 in end member 301 and middle member 303 may be aligned (i.e., oriented in the same direction) so that these members may be installed at the same time, while installation slits 318 in end member 302 are oriented in another direction. For example, installation slits 318 in end member 302 may be oriented in the opposite direction than end member 301 and middle member 303. One technical benefit of orienting the installation slits 318 in opposite directions is to facilitate an air-tight and/or water-tight closure at grommet assembly 200.

Figure 8:
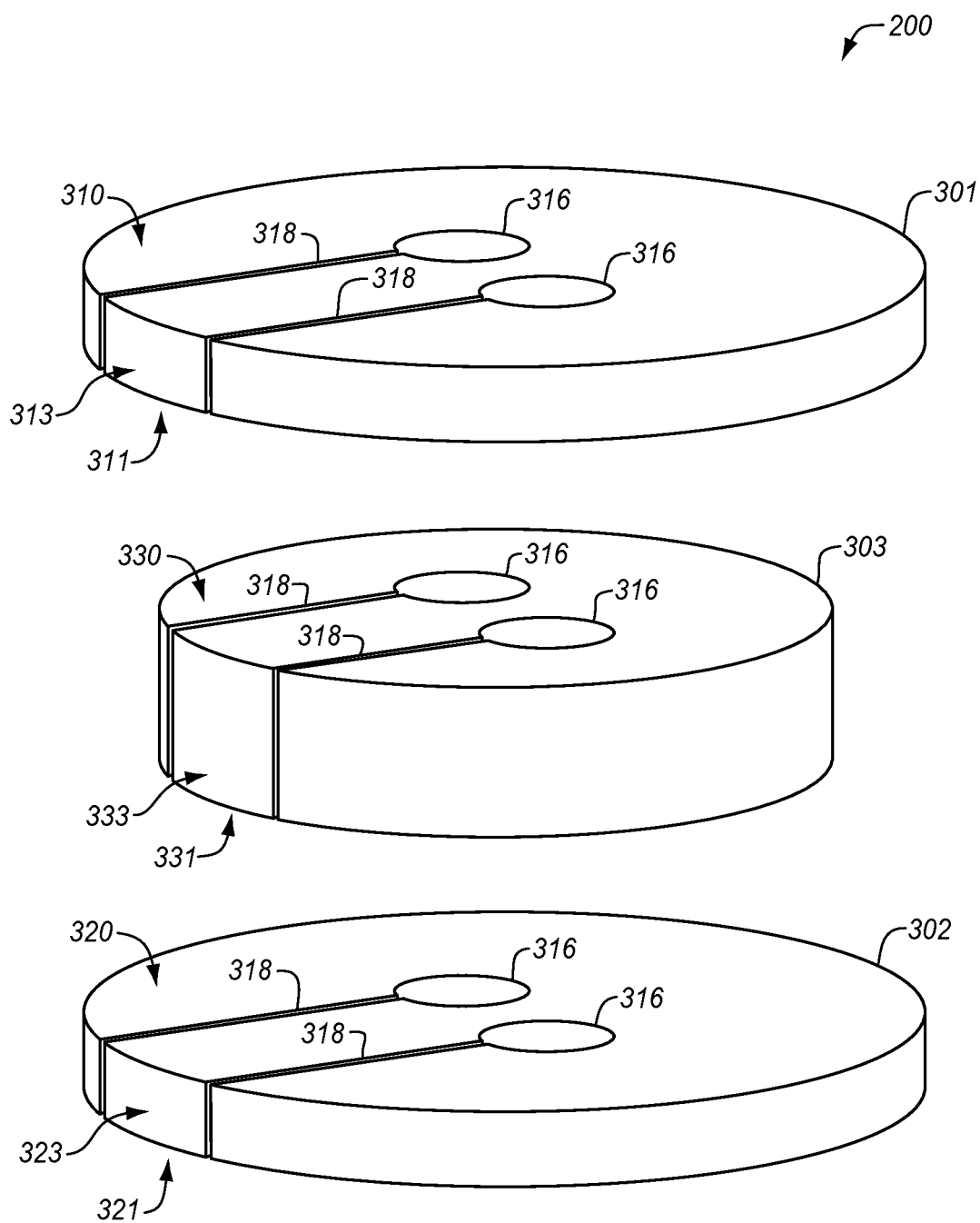
FIG. 8 is an exploded perspective view of a grommet assembly in another illustrative embodiment.

In the FIGS described above, one of the installation slits 318 in members 301-303 is disposed between an outer peripheral surface of the members, and another of the installation slits 318 is disposed between conduit holes 316 (see FIG. 3). However, the position of the installation slits 318 may vary as desired. FIG. 8 is another exploded perspective view of grommet assembly 200 in an illustrative embodiment. In this embodiment, one of the installation slits 318 is disposed between an outer peripheral surface of a member, and one of the conduit holes 316. For example, in end member 301, one installation slit 318 is disposed between outer peripheral surface 313 and each of conduit holes 316. In middle member 303, one installation slit 318 is disposed between outer peripheral surface 333 and each of conduit holes 316. Similarly, in end member 302, one installation slit 318 is disposed between outer peripheral surface 323 and each of conduit holes 316. However, it is understood that the configuration of installation slits 318 may vary as desired.

To secure grommet assembly 200 as a combined unit for installation, end member 301 may be bonded to middle member 303 while or before end member 301 and middle member 303 are installed from top side 102 of panel 100. For example, an adhesive 520 (see FIG. 5) may be applied to at least a portion of the bottom side 311 of end member 301 and/or the top side 330 of middle member 303 to bond these members together (see FIG. 3). With middle member 303 inserted into penetration hole 110, end member 302 may be bonded to middle member 303. For example, an adhesive 520 may be applied to at least a portion of the top side 320 of end member 302 and/or the bottom side 331 of middle member 303 to bond these members together. The members of grommet assembly 200 may also be bonded to panel 100, such as with an adhesive 520. For example, an adhesive 520 may be applied around the annular collar 510 of end members 301-302 so that end members 301-302 are bonded to panel 100 around their periphery (see FIG. 5). It may be desirable for the adhesive 520 to be applied around the entire circumference of annular collars 510 to facilitate an air-tight and/or water-tight closure at grommet assembly 200. An adhesive 520 may also be applied around the outer peripheral surface 333 of middle member 303 to bond middle member 303 to an edge of penetration hole 110.

Figure 9:
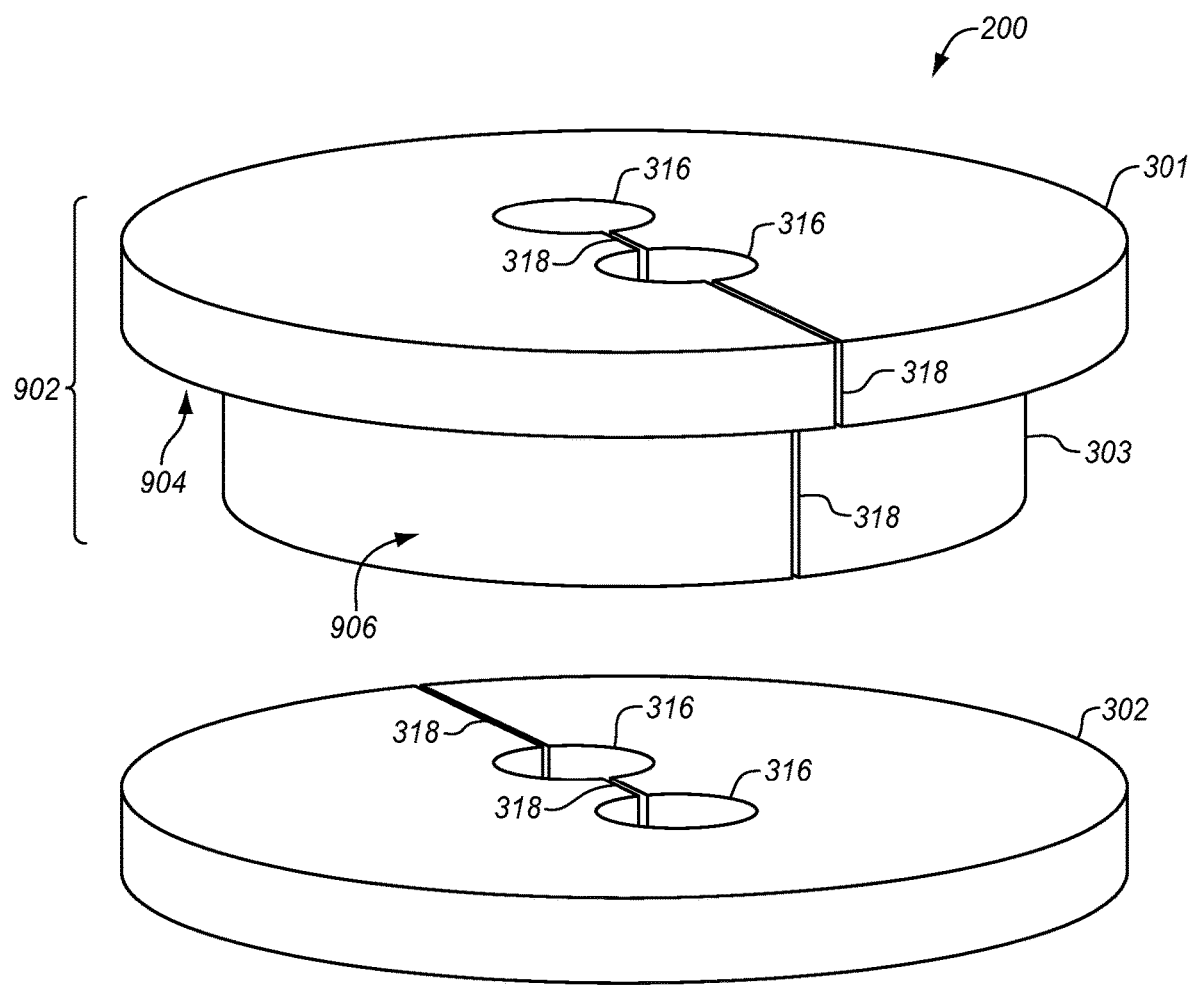
FIG. 9 is an exploded perspective view of a grommet assembly in another illustrative embodiment.

As stated above, end member 301 and middle member 303 may be bonded to one another before insertion of middle member 303 into penetration hole 110. FIG. 9 is an exploded perspective view of grommet assembly 200 in another illustrative embodiment. As shown in FIG. 9, end member 301 and middle member 303 may be bonded together prior to installation (i.e., prior to insertion of middle member 303 in penetration hole 110). In another embodiment, end member 301 and middle member 303 may comprise a monolithic part 902. For example, end member 301 and middle member 303 may be formed into monolithic part 902 with a rubber molding process or the like. Monolithic part 902 is configured to be installed from the top side 102 of panel 100, while end member 302 is configured to be installed from the bottom side 103 of panel 100. The outer peripheral surface 333 of middle member 303 defines an annular wall 906 for monolithic part 902 that projects from bottom side 311 of end member 301 (see also, FIG. 3). Annular wall 906 has a smaller diameter than end member 301. The difference in diameters between middle member 303 and end member 301 defines an annular collar 904 for monolithic part 902.

Figure 10:
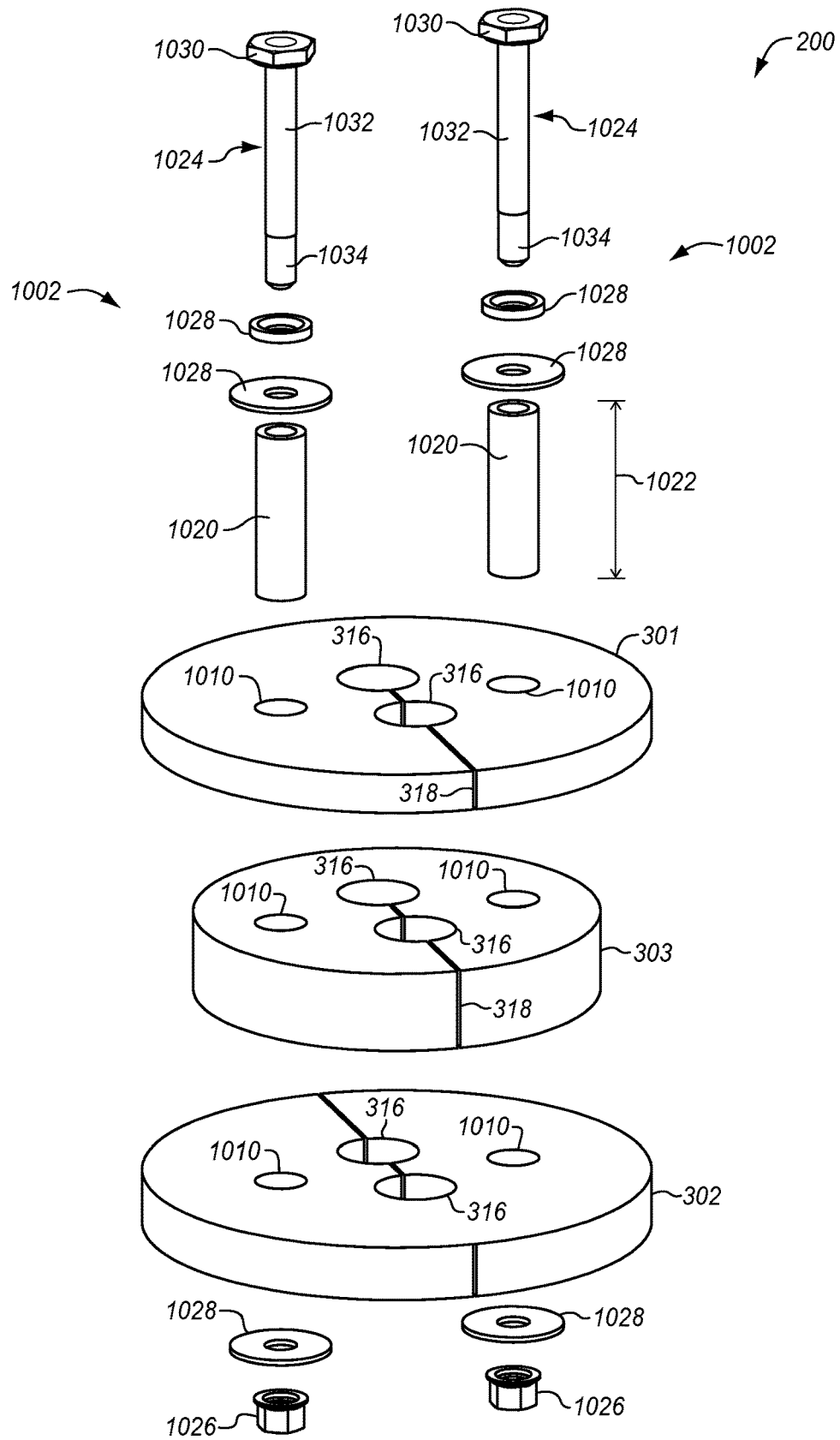
FIG. 10 is an exploded perspective view of a grommet assembly in another illustrative embodiment.

The individual pieces of grommet assembly 200 may be secured together with additional means in other embodiments. FIG. 10 is an exploded perspective view of grommet assembly 200 in another illustrative embodiment. In this embodiment, grommet assembly 200 further includes fasteners 1002 that are configured to secure the members 301-303 together. To facilitate the use of fasteners 1002, end members 301-302 and middle member 303 each include fastener holes 1010, which comprise apertures disposed axially from a top side to a bottom side that are sized to accommodate fasteners 1002. Fastener holes 1010 of each member 301-303 are aligned with one another. The number and placement of fastener holes 1010 is provided as an example, as other configurations are considered herein.

In one embodiment, a fastener 1002 includes a spacer 1020 configured to fit within the fastener holes 1010 of each member 301-303. Spacer 1020 may have a length 1022 that corresponds with the thickness 501 of grommet assembly 200 (see also, FIG. 5). Fastener 1002 also includes a bolt 1024 having a head 1030, a shank 1032, and threads 1034. Shank 1032 is configured to fit within spacer 1020, and a nut 1026 is configured to screw onto threads 1034. Fastener 1002 may also include one or more washers 1028 disposed between head 1030 of bolt 1024 and one end of spacer 1020, and one or more washers 1028 disposed between nut 1026 and the other end of spacer 1020.

Figure 11:
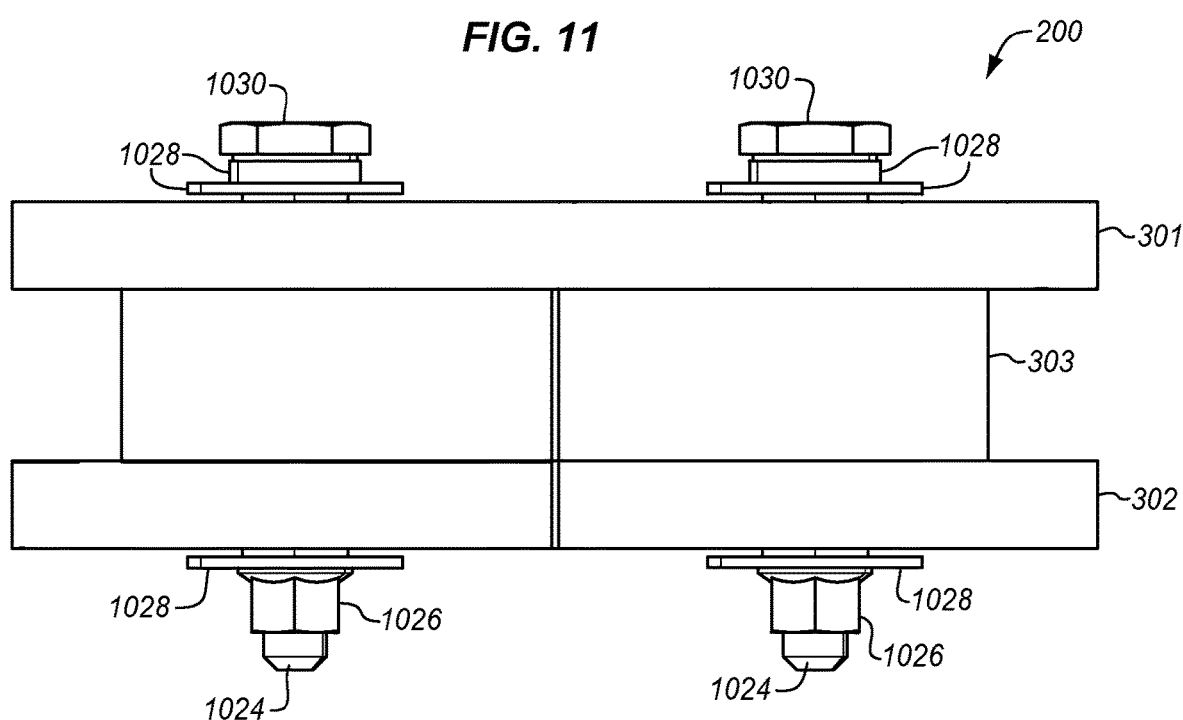
FIG. 11 is a side view of a grommet assembly in an installed configuration in an illustrative embodiment.

FIG. 11 is a side view of grommet assembly 200 in an installed configuration in an illustrative embodiment. For the purpose of this discussion, panel 100 and conduits 112 are again omitted. To secure the members 301-303 of grommet assembly 200 together with fasteners 1002, spacer 1020 (not visible in FIG. 11) is inserted into fastener holes 1010 of members 301-303. Washers 1028 are inserted on bolt 1024, and bolt 1024 is inserted in spacer 1020 from one side of grommet assembly 200. Washers 1028 are inserted on bolt 1024 from the other side of grommet assembly 200, and nut 1026 is threaded onto bolt 1024. Nut 1026 may be tightened to compress spacer 1020 between the nut 1026 and the head 1030 of bolt 1024.

Figure 12:
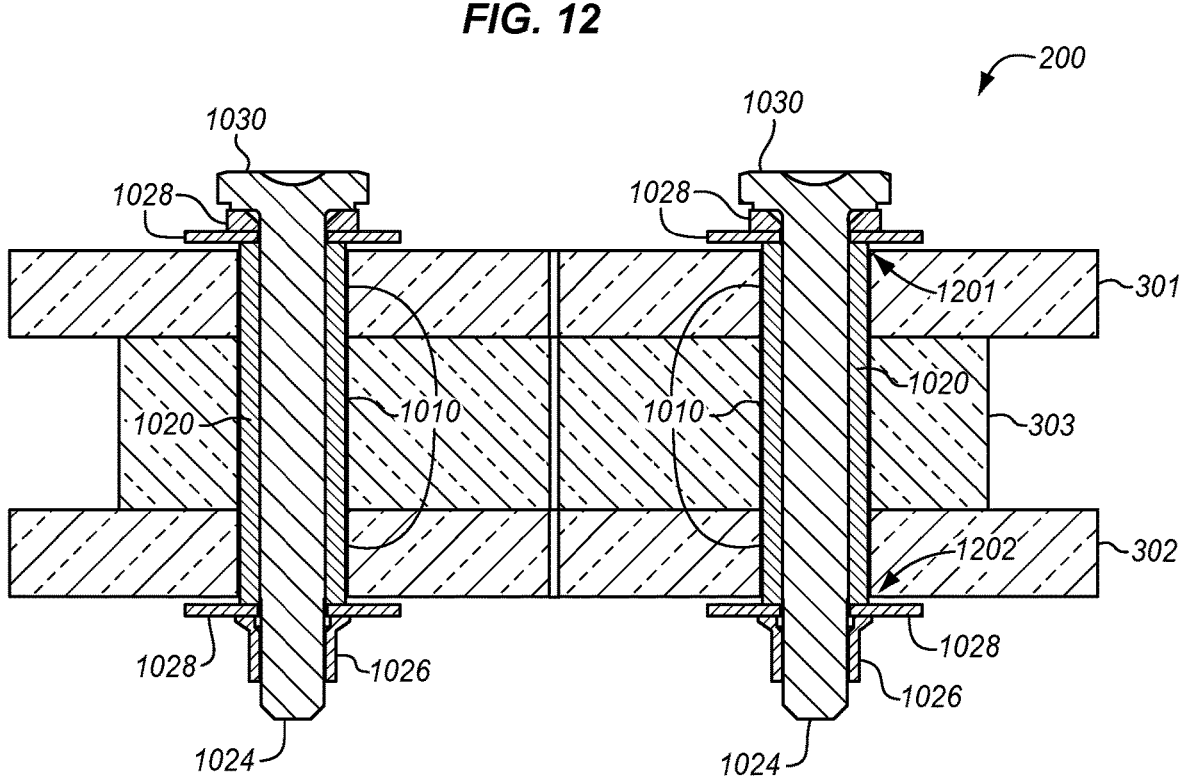
FIG. 12 is a cross-sectional view of a grommet assembly in an illustrative embodiment.

FIG. 12 is a cross-sectional view of grommet assembly 200 in an illustrative embodiment. This view shows fastener holes 1010 through members 301-303, and spacers 1020 disposed through fastener holes 1010. One end 1201 of spacer 1020 is disposed toward head 1030 of bolt 1024, and the other end 1202 of spacer 1020 is disposed toward nut 1026. Thus, spacer 1020 is sandwiched between nut 1026 and head 1030 of bolt 1024 (and associated washers 1028). The length 1022 of spacer 1020 (see FIG. 10) may be selected so that grommet assembly 200 is secured onto panel 100 without compressing members 301-303 with enough force to cause undesired deformation.

Figure 13:
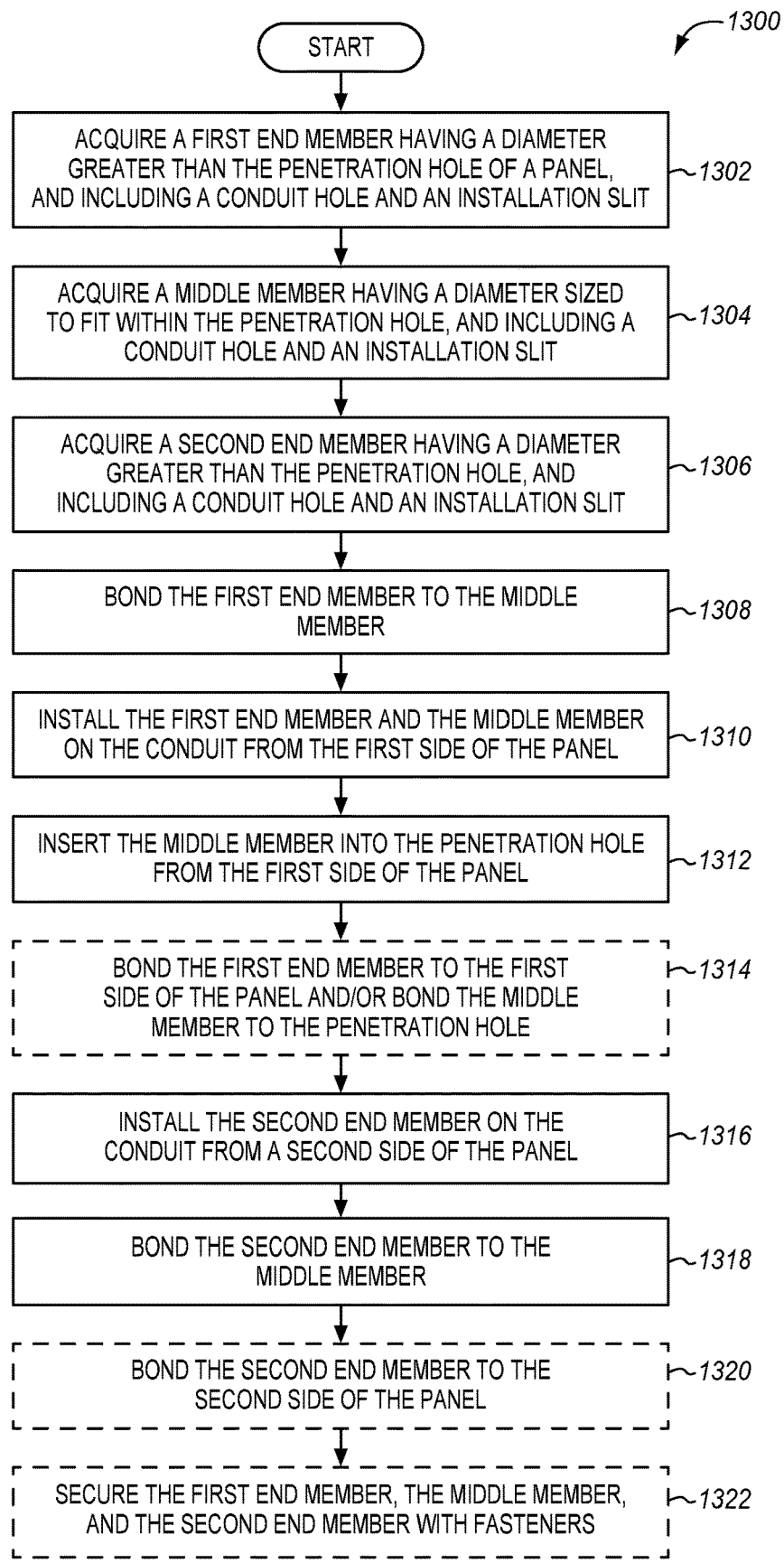
FIG. 13 is a flow chart illustrating a method of installing a grommet assembly in a penetration hole of a panel in an illustrative embodiment.

FIG. 13 is a flow chart illustrating a method 1300 of installing a grommet assembly 200 in a penetration hole 110 of a panel 100 in an illustrative embodiment. The steps of method 1300 will be described with respect to the grommet assembly of FIGS. 3 and 10, although one skilled in the art will understand that the methods described herein may be performed with other types of grommet assemblies. The steps of the methods described herein are not all inclusive and may include other steps not shown. The steps for the flow charts shown herein may also be performed in an alternative order.

It is assumed for method 1300 that a panel 100 has a penetration hole 110 with one or more conduits 112 routed through the penetration hole 110. To install a grommet assembly 200, a first end member 301 is acquired having a diameter greater than the penetration hole 110 of panel 100 (step 1302). The first end member 301 includes a conduit hole 316 (or multiple conduit holes), and an installation slit 318 (or multiple installation slits) disposed between an outer peripheral surface 313 of the first end member 301 and the conduit hole 316 (see also, FIG. 3). A middle member 303 is also acquired having a diameter sized to fit within the penetration hole 110 of panel 100 (step 1304). The middle member 303 includes a conduit hole 316 (or multiple conduit holes), and an installation slit 318 (or multiple installation slits) disposed between an outer peripheral surface 333 of the middle member 303 and the conduit hole 316. A second end member 302 is also acquired having a diameter greater than the penetration hole 110 of panel 100 (step 1306). The second end member 302 includes a conduit hole 316 (or multiple conduit holes), and an installation slit 318 (or multiple installation slits) disposed between an outer peripheral surface 323 of the second end member 302 and the conduit hole 316.

The first end member 301 is bonded to the middle member 303 (step 1308). For example, first end member 301 and middle member 303 may be cleaned and prepped for bonding. An adhesive 520 may be applied to at least a portion of the bottom side 311 of the first end member 301, and/or at least a portion of the top side 330 of the middle member 303. The conduit hole 316 of the first end member 301 is aligned with the conduit hole 316 of the middle member 303, and the installation slit 318 of the first end member 301 is aligned with the installation slit 318 of the middle member 303. The first end member 301 may then be brought into contact with the middle member 303 for sufficient time for the adhesive 520 to cure.

The first end member 301 and the middle member 303 are installed on the conduit 112 from a first side 102 of the panel 100 via the installation slits 318 (step 1310). For example, the installation slits 318 of the first end member 301 and the middle member 303 are spread or flexed open so that the first end member 301 and the middle member 303 may be pressed onto the conduit 112 cross-wise until the conduit 112 is surrounded by the conduit holes 316. The middle member 303 is then inserted or pressed into the penetration hole 110 from the first side 102 of the panel 100 (step 1312). The first end member 301 may be bonded to the first side 102 of the panel 100, and/or the middle member 303 may be bonded to an edge of the penetration hole 110, such as with an adhesive 520 (optional step 1314).

The second end member 302 is installed on the conduit 112 from a second side 103 of the panel 100 via the installation slit 318 (step 1316). For example, the installation slit 318 of the second end member 302 is spread or flexed open so that the second end member 302 may be pressed onto the conduit 112 cross-wise until the conduit 112 is surrounded by the conduit hole 316. The second end member 302 is then bonded to the middle member 303 (step 1318). For example, second end member 302 and middle member 303 may be cleaned and prepped for bonding. An adhesive 520 may be applied to at least a portion of the top side 320 of the second end member 302, and/or at least a portion of the bottom side 331 of the middle member 303. The conduit hole 316 of the second end member 302 is aligned with the conduit hole 316 of the middle member 303. The installation slit 318 of the second end member 302 may be oriented in the opposite direction than the installation slit 318 of the middle member 303. The second end member 302 may then be brought into contact with the middle member 303 for sufficient time for the adhesive 520 to cure. The second end member 302 may be bonded to the second side 103 of the panel 100, such as with an adhesive 520 (optional step 1320). The first end member 301, the middle member 303, and the second end member 302 may also be secured with fasteners 1002 (optional step 1322).

Figure 14:
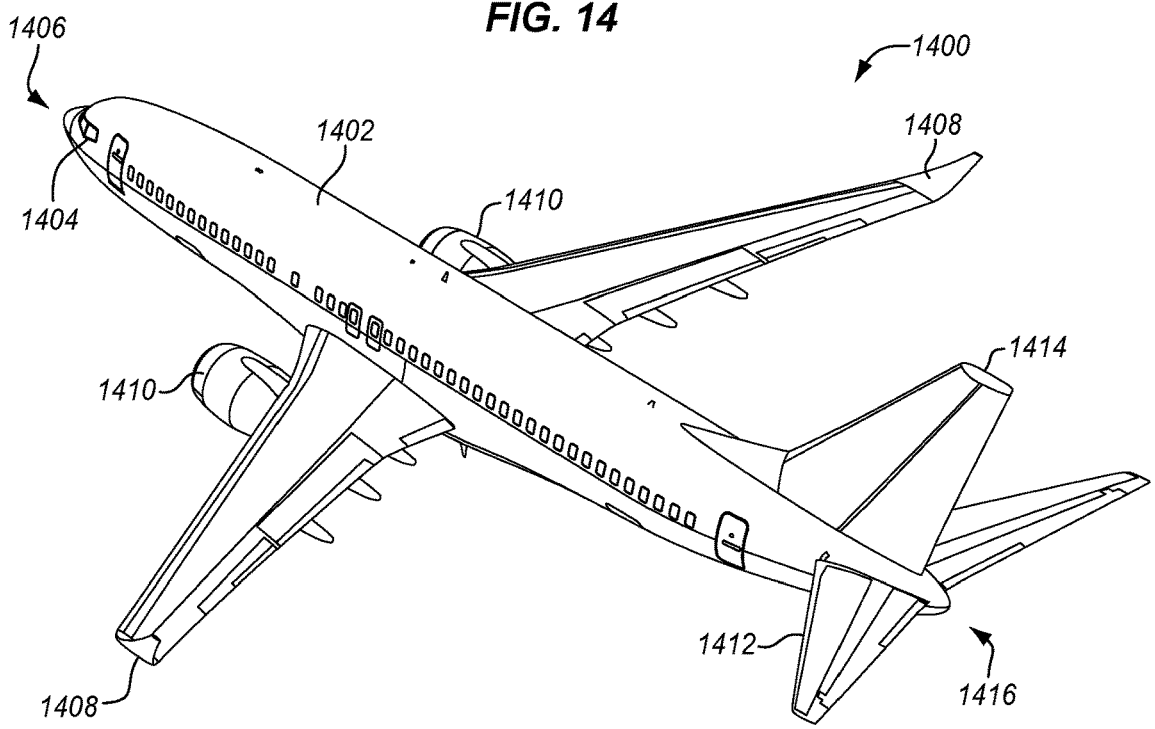
FIG. 14 is a perspective view of an aircraft.

One particular application of grommet assembly 200 may in an aircraft. FIG. 14 is a perspective view of an aircraft 1400. Aircraft 1400 includes a fuselage 1402, which comprises the main body of aircraft 1400. The cockpit 1404 is situated toward the front or nose 1406 of aircraft 1400. A pair of wings 1408 project outward from fuselage 1402 to provide lift for aircraft 1400, and one or more engines 1410 provide thrust. A horizontal stabilizer 1412 and a vertical stabilizer 1414 are situated toward a tail 1416 of aircraft 1400.

Figure 15:
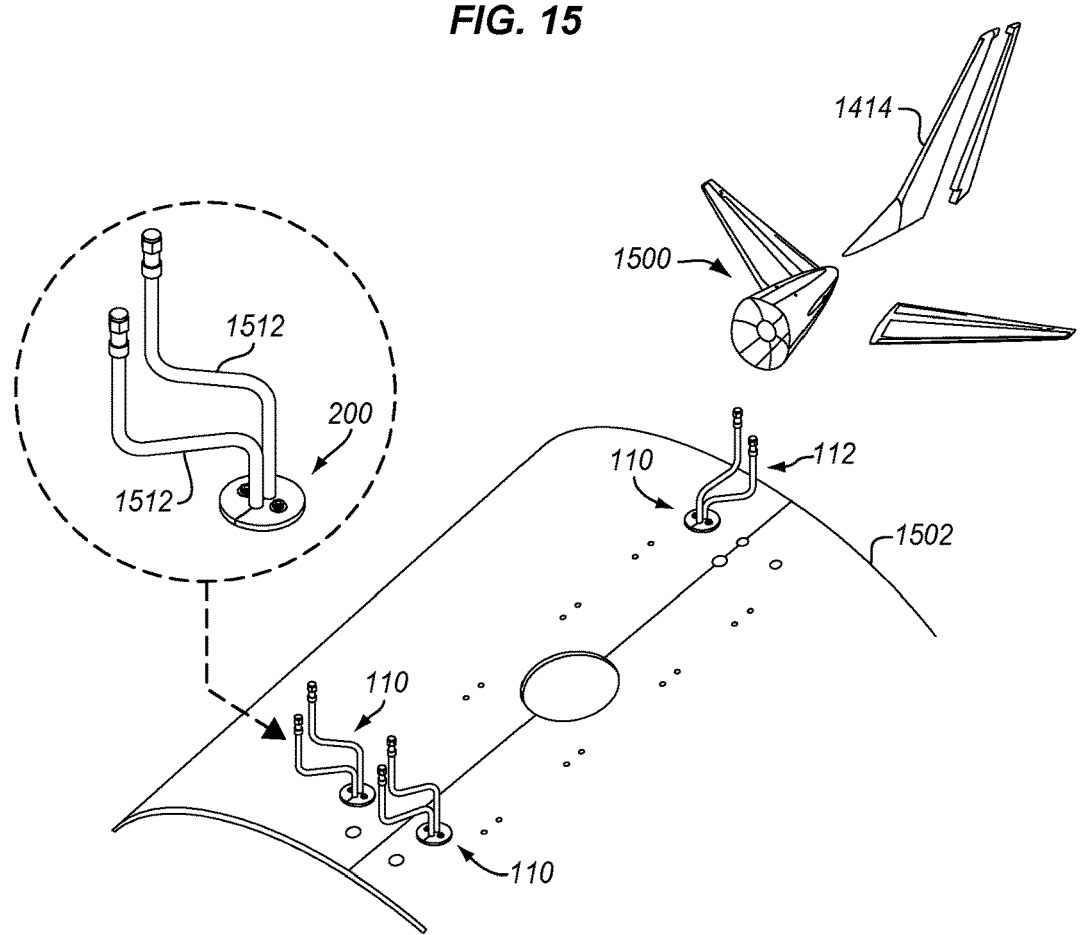
FIG. 15 is a perspective view of a portion of an aircraft in an illustrative embodiment.

FIG. 15 is a perspective view of a portion of aircraft 1400 in an illustrative embodiment. In this embodiment, the vertical fin deck 1500 is located toward the tail 1416 of aircraft 1400, and supports attachment of vertical stabilizer 1414. Vertical fin deck 1500 includes or comprises a composite panel 1502 that includes one or more penetration holes 110 through which hydraulic tubes 1512 are routed. Composite panel 1502 is therefore one example of panel 100 described above. A grommet assembly 200 may be installed in penetration holes 110 to secure hydraulic tubes 1512. Grommet assembly 200 provides thermal insulation to protect composite panel 1502 from high-temperatures of hydraulic tubes 1512, and also provides an air-tight or water-tight closure at penetration holes 110. Grommet assembly 200 is also easier to install in composite panel 1502 as described above, as one of the end members 301-302 does not need to be squeezed through a much smaller diameter of penetration hole 110. Although hydraulic tubes 1512 are illustrated in FIG. 15, other types of conduits 112 may also be routed through penetration holes 110.

Although specific embodiments were described herein, the scope is not limited to those specific embodiments. Rather, the scope is defined by the following claims and any equivalents thereof.

The invention claimed is:

1. A grommet assembly comprising:
a first end member having a diameter greater than a penetration hole of a panel, wherein the first end member includes:
at least one first conduit hole; and
a first installation slit disposed between an outer peripheral surface of the first end member and the at least one first conduit hole;
a middle member having a diameter sized to fit within the penetration hole of the panel, wherein the middle member includes:
at least one second conduit hole; and
a second installation slit disposed between an outer peripheral surface of the middle member and the at least one second conduit hole; and
a second end member having a diameter greater than the penetration hole of the panel, wherein the second end member includes:
at least one third conduit hole; and
a third installation slit disposed between an outer peripheral surface of the second end member and the at least one third conduit hole;
wherein the first end member, the middle member, and the second end member are separate parts made from an elastic material.

2. The grommet assembly of claim 1 wherein:
the middle member is bonded to the first end member with an adhesive prior to insertion of the middle member in the penetration hole from a first side of the panel.

3. The grommet assembly of claim 2 wherein:
the second end member is bonded to the middle member with an adhesive from a second side of the panel after insertion of the middle member in the penetration hole of the panel.

4. The grommet assembly of claim 1 wherein:
the first end member, the middle member, and the second end member are made from rubber.

5. The grommet assembly of claim 1 wherein:
the first end member, the middle member, and the second end member further include one or more fastener holes.

6. The grommet assembly of claim 5 further comprising:
one or more fasteners configured to pass through the fastener holes to secure the first end member, the middle member, and the second end member together.

7. The grommet assembly of claim 6 wherein the fasteners comprise:
a spacer configured to fit within the fastener holes;
a bolt having a head, and having a shank configured to fit within the spacer; and
a nut configured to screw onto threads of the bolt.

8. The grommet assembly of claim 1 wherein:
the panel is a structure of an aircraft; and
the at least one first conduit hole, the at least one second conduit hole, and the at least one third conduit hole are sized to accommodate a hydraulic tube of the aircraft.

9. The grommet assembly of claim 8 wherein:
the panel comprises a composite panel.

10. The grommet assembly of claim 1 wherein:
when installed, the first installation slit of the first end member and the second installation slit of the middle member are aligned, and the third installation slit of the second end member is oriented at an opposite direction than the first installation slit and the second installation slit.

11. An aircraft comprising:
a composite panel that includes a penetration hole through which a conduit is routed; and
a grommet assembly installed in the penetration hole to secure the conduit;
the grommet assembly comprised of separate parts, the separate parts comprising:
a first end member having a diameter greater than the penetration hole;
a middle member having a diameter sized to fit within the penetration hole; and
a second end member having a diameter greater than the penetration hole;
wherein the conduit passes through conduit holes of the first end member, the middle member, and the second end member;
wherein the first end member and the middle member include installation slits configured to flex open enabling the first end member and the middle member to be installed cross-wise onto the conduit from a first side of the composite panel with the conduit holes of the first end member and the middle member surrounding the conduit;
wherein the second end member includes an installation slit configured to flex open enabling the second end member to be installed cross-wise onto the conduit from a second side of the composite panel with the conduit holes of the second end member surrounding the conduit.

12. The aircraft of claim 11 wherein:
the middle member is bonded to the first end member with an adhesive prior to insertion of the middle member in the penetration hole from the first side of the composite panel.

13. The aircraft of claim 12 wherein:
the second end member is bonded to the middle member with an adhesive from the second side of the composite panel after insertion of the middle member in the penetration hole of the composite panel.

14. The aircraft of claim 11 wherein:
an annular collar of the first end member is bonded to the first side of the composite panel with an adhesive;

an annular collar of the second end member is bonded to the second side of the composite panel with the adhesive; and an outer peripheral surface of the middle member is bonded to an edge of the penetration hole with the adhesive.

15. The aircraft of claim 11 wherein:

the installation slit of the second end member is oriented at an opposite direction than the installation slits of the first end member and the middle member.

16. The aircraft of claim 11 wherein:

the grommet assembly further includes:

one or more fasteners installed through fastener holes in the first end member, the middle member, and the second end member to secure the first end member, the middle member, and the second end member together.

17. The aircraft of claim 16 wherein the fasteners comprise:

a spacer configured to fit within the fastener holes;

a bolt having a head, and having a shank configured to fit within the spacer; and a nut configured to screw onto threads of the bolt.

18. A method of installing a grommet assembly in a penetration hole of a panel, wherein a conduit is routed through the penetration hole, the method comprising:

acquiring a first end member having a diameter greater than the penetration hole, and including a first conduit hole and a first installation slit disposed between an outer peripheral surface of the first end member and the first conduit hole;

acquiring a middle member having a diameter sized to fit within the penetration hole, and including a second conduit hole and a second installation slit disposed between an outer peripheral surface of the middle member and the second conduit hole;

acquiring a second end member having a diameter greater than the penetration hole, and including a third conduit hole and a third installation slit disposed between an outer peripheral surface of the second end member and the third conduit hole;

bonding the first end member to the middle member with the first conduit hole aligned with the second conduit hole, and with the first installation slit aligned with the second installation slit;

installing the first end member and the middle member on the conduit from a first side of the panel via the first installation slit and the second installation slit;

inserting the middle member into the penetration hole from the first side of the panel;

installing the second end member on the conduit from a second side of the panel via the third installation slit; and bonding the second end member to the middle member.

19. The method of claim 18 further comprising:

bonding the first end member to the first side of the panel;

bonding the middle member to an edge of the penetration hole; and bonding the second end member to the second side of the panel.

20. The method of claim 18 further comprising:

securing the first end member, the middle member, and the second end member with fasteners.

* * * * *